United States Patent
Bhatkar et al.

(10) Patent No.: US 9,825,986 B1
(45) Date of Patent: Nov. 21, 2017

(54) SYSTEMS AND METHODS FOR GENERATING CONTEXTUALLY MEANINGFUL ANIMATED VISUALIZATIONS OF COMPUTER SECURITY EVENTS

(71) Applicant: Symantec Corporation, Mountain View, CA (US)

(72) Inventors: Sandeep Bhatkar, Sunnyvale, CA (US); Sharada Sundaram, Mountain View, CA (US); Kevin Roundy, El Segundo, CA (US); David Silva, Dublin (IE)

(73) Assignee: Symantec Corporation, Mountain View, CA (US)

(*) Notice: Subject to any disclaimer, the term of this patent is extended or adjusted under 35 U.S.C. 154(b) by 101 days.

(21) Appl. No.: 14/753,038

(22) Filed: Jun. 29, 2015

(51) Int. Cl.
*H04L 29/06* (2006.01)
*H04L 12/26* (2006.01)

(52) U.S. Cl.
CPC ........ *H04L 63/1441* (2013.01); *H04L 43/045* (2013.01); *H04L 63/1416* (2013.01)

(58) Field of Classification Search
CPC ............. H04L 63/1416; H04L 63/1441; H04L 63/1408; H04L 63/1425; H04L 63/1433; H04L 43/045; G06F 21/554
(Continued)

(56) References Cited

U.S. PATENT DOCUMENTS 7,861,300 B2    12/2010    Arnold et al.
8,104,090 B1    1/2012    Pavlyushchik
(Continued)

FOREIGN PATENT DOCUMENTS

CN    102571469    7/2012
CN    102893289    1/2013
EP    2515250    10/2012

OTHER PUBLICATIONS

Hideshima, Yusuke, and Hideki Koike. STARMINE a visualization system for cyber attacks. Proceedings of the 2006 Asia-Pacific Symposium on Information Visualisation—vol. 60. Australian Computer Society, Inc., 2006.*
(Continued)

*Primary Examiner* — Syed Zaidi
(74) *Attorney, Agent, or Firm* — FisherBroyles, LLP

(57) ABSTRACT

The disclosed computer-implemented method for generating contextually meaningful animated visualizations of computer security events may include (1) detecting a security-related event that involves an actor and a target within a computing environment, (2) identifying certain characteristics of the security-related event that collectively describe a context of the security-related event with respect to the actor and the target within the computing environment, (3) generating, based at least in part on the certain characteristics of the security-related event, a graphical animation of the security-related event that graphically represents the context of the security-related event with respect to the actor and the target within the computing environment, and then (4) providing, for presentation to a user, the graphical animation of the security-related event to facilitate visualizing the context of the security-related event with respect to the actor and the target. Various other methods, systems, and computer-readable media are also disclosed.

16 Claims, 8 Drawing Sheets

(58) Field of Classification Search
USPC .......................................................... 726/23
See application file for complete search history.

(56) References Cited

U.S. PATENT DOCUMENTS

| | | | |
|---|---|---|---|
| 8,341,745 B1 | 12/2012 | Chau et al. | |
| 8,566,938 B1 | 10/2013 | Prakash et al. | |
| 2005/0138413 A1 | 6/2005 | Lippmann et al. | |
| 2009/0144308 A1 | 6/2009 | Huie et al. | |
| 2010/0067391 A1* | 3/2010 | Chang | H04L 63/20 370/252 |
| 2010/0186088 A1 | 7/2010 | Banerjee et al. | |
| 2010/0192226 A1 | 7/2010 | Noel et al. | |
| 2010/0235879 A1 | 9/2010 | Burnside et al. | |
| 2010/0257267 A1* | 10/2010 | Sohn | H04L 41/28 709/224 |
| 2011/0047620 A1 | 2/2011 | Mahaffey et al. | |
| 2011/0083180 A1 | 4/2011 | Mashevsky et al. | |
| 2013/0042294 A1 | 2/2013 | Colvin et al. | |
| 2013/0333032 A1 | 12/2013 | Delatorre et al. | |
| 2014/0365646 A1 | 12/2014 | Xiong et al. | |
| 2016/0191558 A1* | 6/2016 | Davison | H04L 63/145 713/171 |

OTHER PUBLICATIONS

Lakkaraju, K., Yurcik, W., & Lee, A. J. (Oct. 2004). NVisionIP: netflow visualizations of system state for security situational awareness. In Proceedings of the 2004 ACM workshop on Visualization and data mining for computer security (pp. 65-72). ACM.*
Ma, Longhui, et al. "Netviewer: A universal visualization tool for wireless sensor networks." Global Telecommunications Conference (GLOBECOM 2010), 2010 IEEE. IEEE, 2010.*
Adam Glick, et al; Systems and Methods for User-Directed Malware Remediation; U.S. Appl. No. 13/419,360, filed Mar. 13, 2012.
Bruce McCorkendale, et al; Systems and Methods for Detecting Malware; U.S. Appl. No. 13/422,702, filed Mar. 16, 2012.
Kevin Roundy, et al; Systems and Methods for Using Event-Correlation Graphs to Detect Attacks on Computing Systems; U.S. Appl. No. 14/041,762, filed Sep. 30, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Carey Nachenberg, et al; Systems and Methods for Neutralizing File-Format-Specific Exploits Included Within Files Contained Within Electronic Communications; U.S. Appl. No. 13/418,332, filed Mar. 12, 2012.
Leylya Yumer, et al; Systems and Methods for Analyzing Zero-Day Attacks; U.S. Appl. No. 13/901,977, filed May 24, 2013.
Lee, Kyumin et al., "Content-Driven Detection of Campaigns in Social Media", http://faculty.cs.tamu.edu/caverlee/pubs/lee11cikm.pdf, as accessed Aug. 8, 2013, CIKM'11; ACM; Glasgow, Scotland, UK, (Oct. 2011).
Bhuyan, Monowar H., et al., "AOCD: An Adaptive Outlier Based Coordinated Scan Detection Approach", http://www.cs.uccs.edu/~jkalita/papers/2012/BhuyanMonowarIJNS2012.pdf, as accessed Aug. 8, 2013, International Journal of Network Security; vol. 14, No. 6, (Nov. 2012), 339-351.
Eberle, William et al., "Graph-based approaches to insider threat detection", http://dl.acm.org/citation.cfm?id=1558658, as accessed Aug. 8, 2013, CSIIRW '09 Proceedings of the 5th Annual Workshop on Cyber Security and Information Intelligence Research: Cyber Security and Information Intelligence Challenges and Strategies; Article No. 44; ACM; (2009).
Splunk, Inc., "Detecting Advanced Persistent Threats—Using Splunk for APT", http://www.splunk.com/web_assets/pdfs/secure/Splunk_for_APT_Tech_Brief.pdf, as accessed Aug. 8, 2013, Tech Brief, (Jan. 4, 2012).
Triumfant, Inc., "Detecting the Advanced Persistent Threat", www.triumfant.com/advanced_persistent_threat.asp, as accessed Aug. 8, 2013, (Nov. 30, 2010).
EMC Corporation, "Advanced Persistent Threat (APT) and Rootkit Detection", http://www.siliciumsecurity.com/advanced-persistent-threats-and-rootkits-detection/, as accessed Aug. 8, 2013, (2012).
Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004),138-142.
Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.
Julisch, Klaus, "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.
Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.
Gu, Guofei et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).
Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).
Zamlot, Loai et al., "Prioritizing intrusion analysis using Dempster-Shafer theory", http://dl.acm.org/citation.cfm?id=2046694, as accessed Nov. 13, 2013, AISec '11 Proceedings of the 4th ACM workshop on Security and artificial intelligence, ACM, New York, NY, (2011), 59-70.
Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.
Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.
Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).
Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.
Tedesco, Gianni et al., "Real-Time Alert Correlation with Type Graphs", http://dl.acm.org/citation.cfm?id=1496279, as accessed

(56) References Cited

OTHER PUBLICATIONS

Nov. 13, 2013, ICISS '08 Proceedings of the 4th International Conference on Information Systems Security, Springer-Verlag Berlin, Heidelberg, (2008), 173-187.
Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).
Wang, Ting et al., "Microscopic Social Influence", http://www.cc.gatech.edu/~lingliu/papers/2012/TingWang-SDM2012.pdf, as accessed Nov. 13, 2013, SDM 2012, (2012).
Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).
Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.
Acar Tamersoy, et al; Systems and Methods for Adjusting Suspiciousness Scores in Event-Correlation Graphs; U.S. Appl. No. 14/138,891, filed Dec. 23, 2013.
Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).
"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).
"Advanced Persistent Threat (APT) Attack & Zero-Day Protection", http://www.fireeye.com/, as accessed Feb. 6, 2014, FireEye, Inc., (2006).
"Advanced Threat Defense", http://www.fidelissecurity.com/advanced-persistent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, A FireEye Company, (Mar. 1, 2013).
"Mandiant for Intelligent Response", http://www.mandiant.com/products/mandiant-platform/intelligent-response, as accessed Feb. 6, 2014, Mandiant, A FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al.; Systems and Methods for Using Event-Correlation Graphs to Generate Remediation Procedures; U.S. Appl. No. 14/221,703, filed Mar. 21, 2014.
Kevin Alejandro Roundy, et al.; Systems and Methods for Classifying Security Events as Targeted Attacks; U.S. Appl. No. 14/513,804, filed Oct. 14, 2014.
Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security, (Jan. 2009).
Constantin, Lucian "Attackers used known exploit to steal customer log-in credentials, vBulletin maker says", http://www.networkworld.com/article/2171967/access-control/attackers-used-known-exploit-to-steal-customer-log-in-credentials--vbulletin-maker-sa.html, IDG News Service, Network World, (Nov. 18, 2013).
"Recovery Manager for Active Directory Forest Edition", http://software.dell.com/documents/recovery-manager-for-active-directory-forest-edition-datasheet-26622.pdf, Dell, Inc., (Nov. 2013).
Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).
Dezert, Jean et al., "On the Validity of Dempster-Shafer Theory", Fusion 2012—15th International Conference on Information Fusion, Singapour, Singapore, (Jul. 2012).
Christopher Gates, et al.; Systems and Methods for Curating File Clusters for Security Analyses; U.S. Appl. No. 14/733,983, filed Jun. 9, 2015.
"D3.js", http://d3js.org/, as accessed May 13, 2015, (Sep. 25, 2011).
"FireEye", https://www.fireeye.com/, as accessed May 13, 2015, (Oct. 12, 1999).

* cited by examiner

SYSTEMS AND METHODS FOR GENERATING CONTEXTUALLY MEANINGFUL ANIMATED VISUALIZATIONS OF COMPUTER SECURITY EVENTS

BACKGROUND

Computer security systems often monitor computing devices and/or environments for potential security threats. For example, a traditional computer security system may collect information about suspicious activity from various computing devices within a computing environment. In this example, the traditional computer security system may analyze the information collected from the computing devices within the computing environment and then determine whether to classify any of the suspicious activity as malicious based at least in part on the collected information.

However, in addition to facilitating such analyses by the traditional computer security system, the collected information may serve various other purposes. In one example, the collected information may enable a human security analyst to gain certain insight into the suspicious activity. For example, the traditional computer security system may detect a download of an unfamiliar file to a computing device within the computing environment. In this example, rather than attempting to classify the unfamiliar file entirely on its own, the traditional computer security system may turn to the human security analyst for the final decision as to whether the unfamiliar file should be classified as malicious, clean, or unknown.

Unfortunately, while the human security analyst may have certain unprogrammable intuition and/or skill for making such security decisions, the traditional computer security system may fail to present the collected information to the human security analyst in an efficient, meaningful way. Additionally or alternatively, the traditional computer security system may be unable to winnow out the contextually relevant information from any contextually irrelevant information. As a result, the human security analyst may need to wade through a large amount of collected information (including, e.g., both relevant and irrelevant information) to gain enough insight to classify and/or address the unknown file's threat risk.

As another example, the collected information may enable a business executive to gain certain insight regarding high-level business decisions. For example, a security analyst may present a computer security demonstration involving the collected information to the board of directors of a company. In this example, the board of directors may ultimately rely on some of the collected information presented during the computer security demonstration to make certain high-level business decisions about the direction and/or fate of the company. Unfortunately, the traditional computer security system may be unable to output the collected information in a way that would be readily understandable and/or meaningful to the mostly non-technical board of directors. As a result, the security analyst may present a somewhat confusing demonstration of the collected information to the board of directors or, even worse, mislead the board of directors altogether as to the significance of the collected information.

The instant disclosure, therefore, identifies and addresses a need for additional and improved systems and methods for generating contextually meaningful animated visualizations of computer security events.

SUMMARY

As will be described in greater detail below, the instant disclosure describes various systems and methods for generating contextually meaningful animated visualizations of computer security events.

In one example, a computer-implemented method for generating contextually meaningful animated visualizations of computer security events may include (1) detecting a security-related event that involves an actor and a target within a computing environment, (2) identifying certain characteristics of the security-related event that collectively describe a context of the security-related event with respect to the actor and the target within the computing environment, (3) generating, based at least in part on the certain characteristics of the security-related event, a graphical animation of the security-related event that graphically represents the context of the security-related event with respect to the actor and the target within the computing environment, and then (4) providing, for presentation to a user, the graphical animation of the security-related event to facilitate visualizing the context of the security-related event with respect to the actor and the target within the computing environment.

In one example, the method may also include generating a motion-picture representation of the security-related event that, when presented to the user, changes with a passing of time. Additionally or alternatively, the method may include generating a graphical timeline to which the motion-picture representation is synchronized such that, when presented to the user, the motion-picture representation changes consistent with the passing of time shown on the graphical timeline.

In one example, the graphical animation of the security-related event may include a graphical node that represents the actor, another graphical node that represents the target, and/or a graphical edge that represents an action performed by the actor on the target in connection with the security-related event.

In one example, the method may also include generating a motion-picture representation of the security-related event that, when presented to the user, animates the action performed by the actor on the target using the graphical node, the other graphical node, and the graphical edge. Additionally or alternatively, the method may include generating a motion-picture representation of the security-related event that, when presented to the user, animates a sequential flow of actions occurring over time with respect to at least the actor and the target within the computing environment.

In one example, the method may also include generating the motion-picture representation of the security-related event such that, when presented to the user, the motion-picture representation depicts at least one action in the sequential flow of actions being performed by the actor and at least one other action in the sequential flow of actions being performed by the target. Additionally or alternatively, the method may also include generating the motion-picture representation of the security-related event such that, when presented to the user, the motion-picture representation depicts the actor positioned on a left side of the target on a display and animates a time-based occurrence of the sequential flow of actions that flows from a left side of the display to a right side of the display over time.

In one example, the method may also include identifying a severity level of the security-related event. The severity level may be identified in a variety of different ways, including, for example, determining a reputation of the actor, determining a reputation of the target, determining a reputation of a file involved in the security-related event, and/or determining a prevalence of a file involved in the security-related event. The method may further include providing, within the graphical animation of the security-related event, an animated feature designed to convey the severity level of the security-related event.

In one embodiment, a system for implementing the above-described method may include (1) a detection module, stored in memory, that detects a security-related event that involves an actor and a target within a computing environment, (2) an identification module, stored in memory, that identifies certain characteristics of the security-related event that collectively describe a context of the security-related event with respect to the actor and the target within the computing environment, (3) a generation module, stored in memory, that generates, based at least in part on the certain characteristics of the security-related event, a graphical animation of the security-related event that graphically represents the context of the security-related event with respect to the actor and the target within the computing environment, (4) a presentation module, stored in memory, that provides, for presentation to a user, the graphical animation of the security-related event to facilitate visualizing the context of the security-related event with respect to the actor and the target within the computing environment, and (5) at least one physical processor configured to execute the detection module, the identification module, the generation module, and the presentation module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a security-related event that involves an actor and a target within a computing environment, (2) identify certain characteristics of the security-related event that collectively describe a context of the security-related event with respect to the actor and the target within the computing environment, (3) generate, based at least in part on the certain characteristics of the security-related event, a graphical animation of the security-related event that graphically represents the context of the security-related event with respect to the actor and the target within the computing environment, and then (4) provide, for presentation to a user, the graphical animation of the security-related event to facilitate visualizing the context of the security-related event with respect to the actor and the target within the computing environment.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
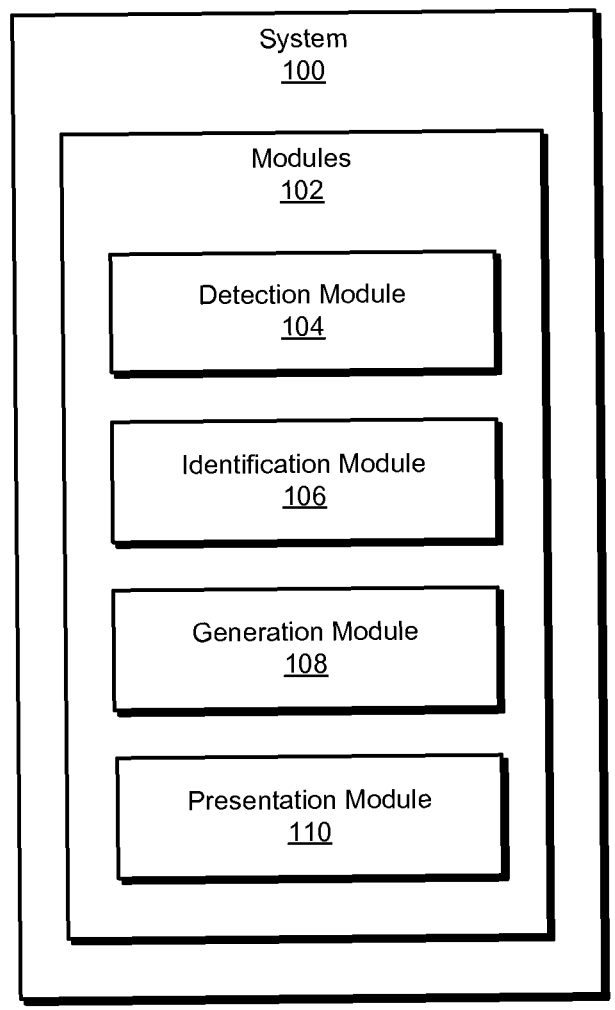
FIG. 1 is a block diagram of an exemplary system for generating contextually meaningful animated visualizations of computer security events.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for generating contextually meaningful animated visualizations of computer security events. As will be explained in greater detail below, by generating a graphical animation of a computer security event based at least in part on known characteristics of the computer security event, the various systems and methods described herein may be able to provide the graphical animation to a security analyst to facilitate visualizing the context of the computer security event. In other words, these systems and methods may be able to present the computer security event to the security analyst in the proper context as an efficient, meaningful graphical animation. By facilitating visualization of the context of the computer security event in this way, the various systems and method described herein may enable the security analyst to gain enough insight into the computer security event to make a quick, accurate decision on how to classify and/or address the computer security event.

Additionally or alternatively, by generating a graphical animation of a computer security event based at least in part on known characteristics of the computer security event, the various systems and methods described herein may be able to provide the graphical animation to a non-technical user (e.g., a business executive) to facilitate visualizing the context of the computer security event. In other words, these systems and methods may be able to present the computer security event to the non-technical user in the proper context as an efficient, meaningful graphical animation. By facilitating visualization of the context of the computer security event in this way, the various systems and method described herein may enable the non-technical user to gain a fairly accurate understanding as to the nature of the computer security event even in the event that the non-technical user is not highly educated or technically savvy in the computer security arts.

Figure 2:
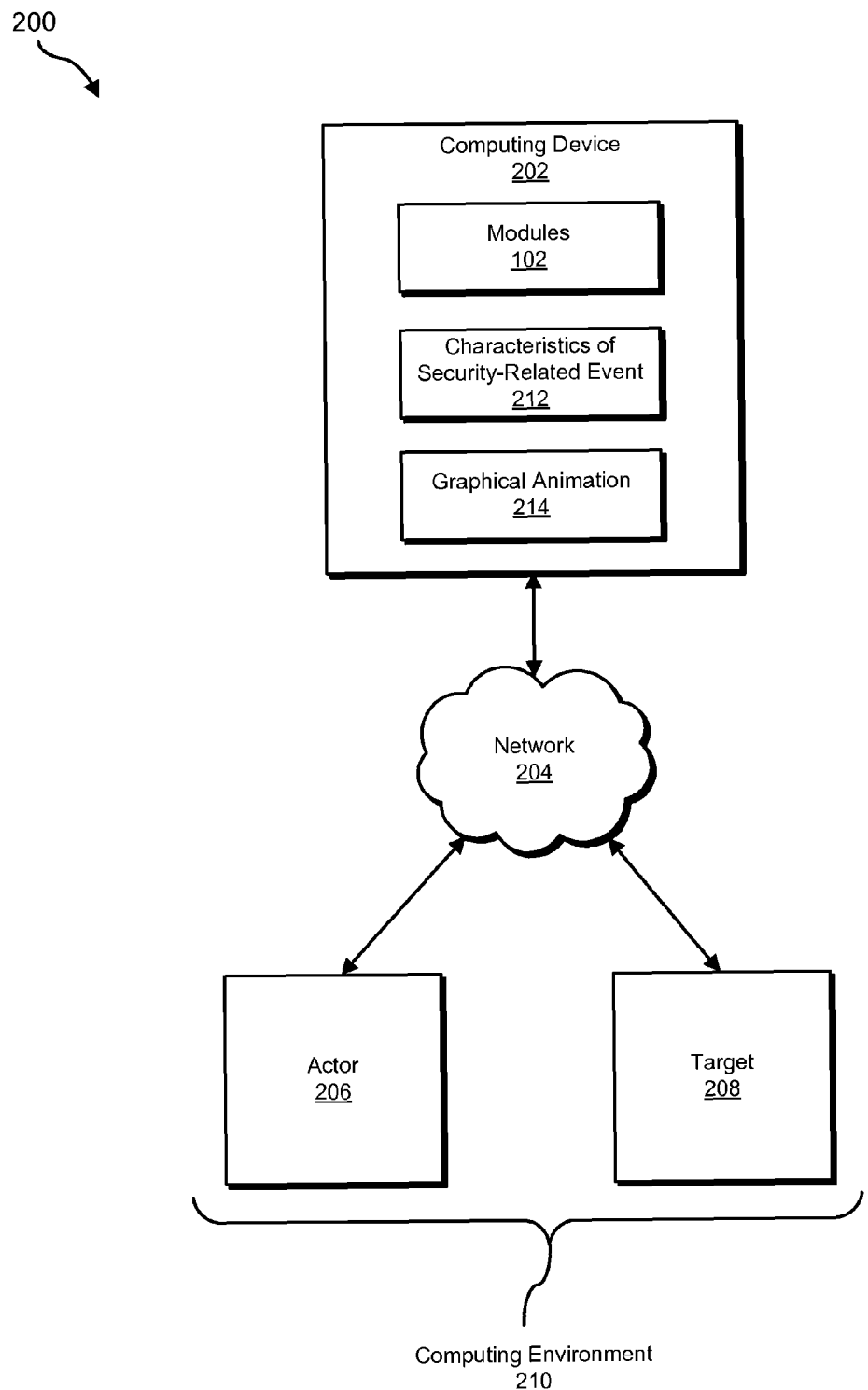
FIG. 2 is a block diagram of an additional exemplary system for generating contextually meaningful animated visualizations of computer security events.

The following will provide, with reference to FIGS. 1-2, detailed descriptions of exemplary systems for generating contextually meaningful animated visualizations of computer security events. Detailed descriptions of corresponding computer-implemented methods will be provided in connection with FIG. 3. Detailed descriptions of an exemplary graphical animation of a security-related event at different points in time will be provided in connection with FIGS. 4-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for generating contextually meaningful animated visualizations of computer security events. As illustrated in this figure, exemplary system 100 may include one or more modules 102 for performing one or more tasks. For example, and as will be explained in greater detail below, exemplary system 100 may include a detection module 104 that detects a security-related event that involves an actor and a target within a computing environment. Exemplary system 100 may also include an identification module 106 that identifies certain characteristics of the security-related event that collectively describe a context of the security-related event with respect to the actor and the target within the computing environment.

In addition, and as will be described in greater detail below, exemplary system 100 may include a generation module 108 that generates, based at least in part on the certain characteristics of the security-related event, a graphical animation of the security-related event with respect to the actor and the target within the computing environment. Exemplary system 100 may further include a presentation module 110 that provides, for presentation to a user, the graphical animation of the security-related event to facilitate visualizing the context of the security-related event with respect to the actor and the target within the computing environment. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, actor 206, and/or target 208), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an actor 206 and/or a target 208 via a network 204. In this example, actor 206 and/or target 208 may be included in a computing environment 210.

In one example, computing device 202 may be programmed with one or more of modules 102. In this example, computing device 202 may identify and/or compile characteristics 212 of a security-related event and then generate, based at least in part on characteristics 212 of the security-related event, a graphical animation 214 of the security-related event.

Additionally or alternatively, actor 206 and/or target 208 may be programmed with one or more of modules 102. In such examples, actor 206 and/or target 208 may identify and/or compile characteristics 212 of a security-related event and then generate, based at least in part on characteristics 212 of the security-related event, a graphical animation 214 of the security-related event.

In one embodiment, one or more of modules 102 from FIG. 1 may, when executed by at least one processor of computing device 202, actor 206, and/or target 208, enable computing device 202, actor 206, and/or target 208 to generate contextually meaningful animated visualizations of computer security events. For example, and as will be described in greater detail below, one or more of modules 102 may cause computing device 202 to (1) detect a security-related event that involves actor 206 and target 208 within computing environment 210, (2) identify characteristics 212 of the security-related event that collectively describe a context of the security-related event with respect to actor 206 and target 208 within computing environment 210, (3) generate, based at least in part on characteristics 212 of the security-related event, graphical animation 214 of the security-related event that graphically represents the context of the security-related event with respect to actor 206 and target 208 within computing environment 210, and then (4) provide, for presentation to a user, graphical animation 214 of the security-related event to facilitate visualizing the context of the security-related event with respect to actor 206 and target 208 within computing environment 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations of one or more of the same, combinations of one or more of the same, exemplary computing system 710 in FIG. 7, or any other suitable computing device.

Actor 206 generally represents any type or form of computing device, computing process, software, and/or file. Examples of actor 206 include, without limitation, computers, servers, cellular phones, mobile devices, applications, executables, processes, scripts, files, variations of one or more of the same, combinations of one or more of the same, exemplary computing system 710 in FIG. 7, or any other suitable actor. Although illustrated as a stand-alone entity in FIG. 2, actor 206 may be running on and/or included in a computing device that is not illustrated in FIG. 2.

Target 208 generally represents any type or form of computing device, computing process, software, and/or file. Examples of target 208 include, without limitation, computers, servers, cellular phones, mobile devices, applications, executables, processes, scripts, files, variations of one or more of the same, combinations of one or more of the same, exemplary computing system 710 in FIG. 7, or any other suitable target. Although illustrated as a stand-alone entity in FIG. 2, target 208 may be running on and/or included in a computing device that is not illustrated in FIG. 2. Additionally or alternatively, actor 206 and target 208 may represent the same entity. For example, actor 206 may copy and/or clone itself to form target 208.

Computing environment 210 generally represents any combination of computing elements and/or devices. For example, computing environment 210 may include and/or represent a group of networked computing devices within an organization or company. Additionally or alternatively, computing environment 210 may include and/or represent a group of computing and/or storage elements within a single physical computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication among computing device 202, actor 206, and/or target 208.

Characteristics 212 of a security-related event generally represent any collection or set of attributes, qualities, features, data, and/or information that relate to and/or describe the context of the security-related event. In one example, characteristics 212 of a security-related event may identify (1) an actor that performs an action on a target, (2) the target on which the action is performed, (3) the action itself, (4) a timestamp marking the time that the action occurred, and/or (5) the potential severity or fallout of the action. In this example, characteristics 212 may include and/or represent a 5-tuple that describes the context of the security-related event.

Graphical animation 214 of a security-related event generally represents any type or form of graphical representation, visualization, and/or depiction that includes an animated interpretation of the security-related event. In some examples, graphical animation 214 of a security-related event may include and/or represent a motion-picture representation of the security-related event that, when presented to a user, changes with the passing of time. In one example, graphical animation 214 of the security-related event may further include and/or represent a graphical timeline to which the motion-picture representation is synchronized such that, when presented to the user, the motion-picture representation changes consistent with the passing of time shown on the graphical timeline. Graphical animation 214 may include and/or represent any combination of images, icons, shapes, colors, and/or sequences that, when presented to the user in an animated format, convey the context of the security-related event in a meaningful, easily understood way.

Figure 3:
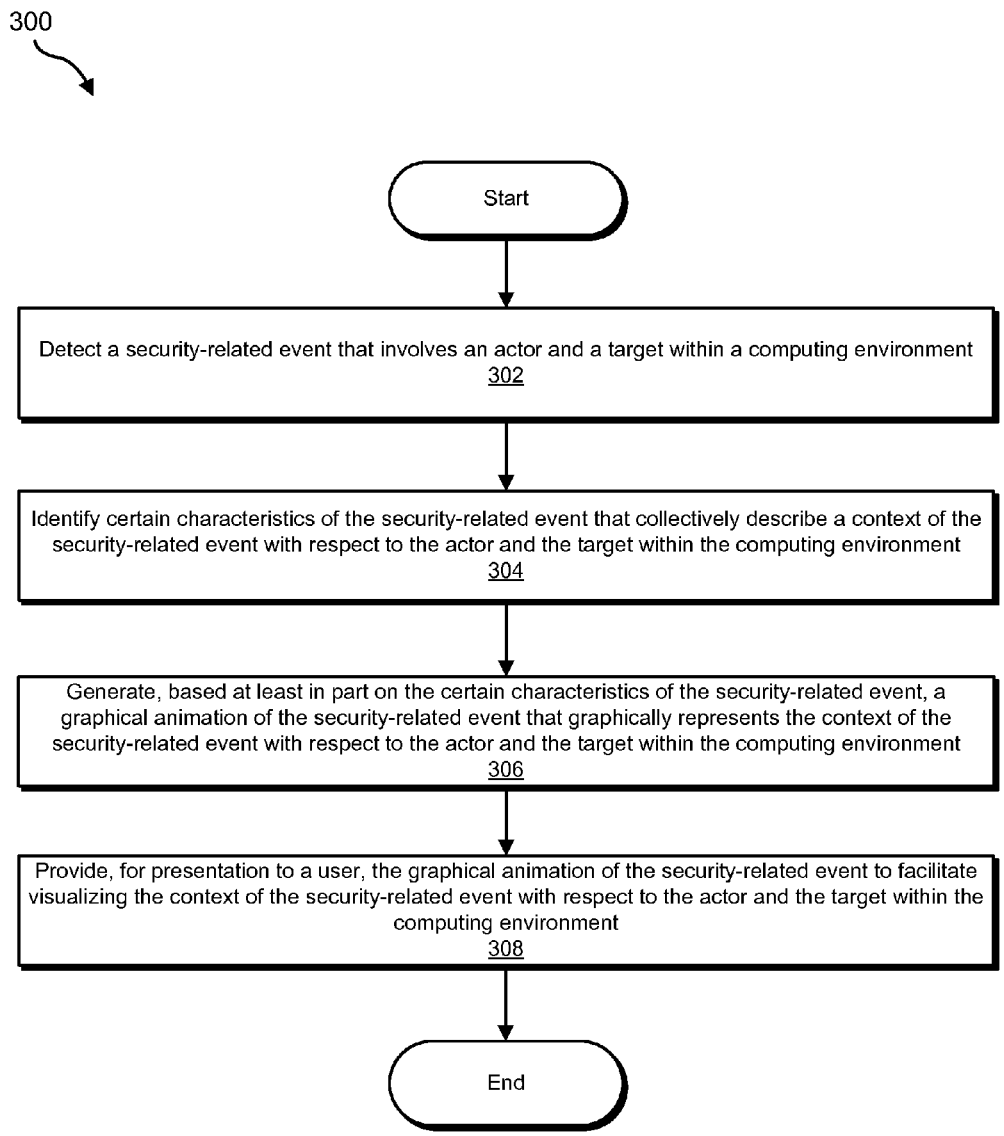
FIG. 3 is a flow diagram of an exemplary method for generating contextually meaningful animated visualizations of computer security events.

FIG. 3 is a flow diagram of an exemplary computer-implemented method 300 for generating contextually meaningful animated visualizations of computer security events. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may detect a security-related event that involves an actor and a target within a computing environment. For example, detection module 104 may, as part of computing device 202 in FIG. 2, detect a security-related event that involves actor 206 and target 208 within computing environment 210. Examples of the security-related event include, without limitation, targeted attacks, suspicious files, suspicious downloads, suspicious transfers, suspicious computing behaviors or activity, clearly malicious computing behaviors or activity, self-copying or self-replication of code, load-point installations, process injections, remote logins, details about the same (such as the actors and/or targets, times of occurrence, severity levels, etc.), evidence and/or indicators of one or more of the same, variations of one or more of the same, combinations of one or more of the same, or any other events involving and/or related to computer security.

The term "targeted attack," as used herein, generally refers to any type or form of computer-based attack and/or campaign that is specifically targeting one or more organizations. In one example, a targeted attack may target a single organization. In another example, a targeted attack may target a plurality of organizations. Additionally or alternatively, portions of a targeted attack may have been reused and/or recycled from one or more previous targeted attacks perpetrated by a specific threat group.

The systems described herein may perform step 302 in a variety of ways and/or contexts. In some examples, detection module 104 may detect the security-related event by monitoring computing environment 210. For example, detection module 104 may monitor computing environment 210 for any suspicious and/or potentially malicious behavior or activity. While monitoring computing environment 210, detection module 104 may detect certain suspicious and/or potentially malicious behavior or activity involving actor 206 and/or target 208. This suspicious and/or potentially malicious behavior may spawn and/or represent at least a portion of the security-related event.

Additionally or alternatively, detection module 104 may detect the security-related event by collecting security information from actor 206 and/or target 208 (or the computing device(s) that execute actor 206 and/or target 208). For example, detection module 104 may be included in and/or represent a portion of a computer security system that collects security information at computing device 202. In this example, the computer security system may also include and/or deploy security agents and/or clients that run on actor 206 and/or target 208 (or the computing device(s) that execute actor 206 and/or target 208). Accordingly, such security agents and/or clients may monitor actor 206 and/or target 208 (or the computing device(s) that execute actor 206 and/or target 208) for any suspicious and/or potentially malicious behavior or activity.

Continuing with the above example, the security agents and/or clients may identify and/or compile certain security information pertaining to actor 206 and/or target 208. In some examples, the security information may include any type or form of evidence and/or indicators of suspicious and/or potentially malicious behavior or activity involving actor 206 and/or target 208. In one example, the security information may indicate that actor 206 has performed a specific action on target 208 at a certain point in time. Additionally or alternatively, the security information may include evidence used to deduce and/or determine that actor 206 has performed a specific action on target 208 at a certain point in time.

The security agents and/or clients may send the security information from actor 206 and/or target 208 (or the computing device(s) that execute actor 206 and/or target 208) to computing device 202 via network 204. As the security information arrives at computing device 202, detection module 104 may identify the security information and then detect the security-related event based at least in part on the security information received from actor 206 and/or target 208 (or the computing device(s) that execute actor 206 and/or target 208).

Returning to FIG. 3, at step 304 one or more of the systems described herein may identify certain characteristics of the security-related event that collectively describe a context of the security-related event with respect to the actor and the target within the computing environment. For example, identification module 106 may, as part of computing device 202 in FIG. 2, identify characteristics 212 of the security-related event that collectively describe a context of the security-related event with respect to the actor and the target within the computing environment. The term "context," as used herein in connection with a security-related event, generally refers to any details, background, facts, and/or specifics regarding and/or surrounding the security-related event.

The systems described herein may perform step 304 in a variety of ways and/or contexts. In some examples, identification module 106 may identify characteristics 212 of the security-related event based at least in a part on any suspicious and/or potentially malicious behavior or activity detected within computing environment 210. For example, identification module 106 may analyze and/or examine any evidence of the suspicious and/or potentially malicious behavior or activity detected while detection module 104 was monitoring computing environment 210. During this analysis and/or examination, identification module 106 may identify characteristics 212 of the security-related event within the evidence.

Additionally or alternatively, identification module 106 may identify characteristics 212 of the security-related event based at least in a part on any security information collected from actor 206 and/or target 208 (or the computing device(s) that execute actor 206 and/or target 208). For example, identification module 106 may analyze and/or examine security information received from actor 206 and/or target 208 (or the computing device(s) that execute actor 206 and/or target 208). During this analysis and/or examination, identification module 106 may identify characteristics 212 of the security-related event within the security information.

Returning to FIG. 3, at step 306 one or more of the systems described herein may generate, based at least in part on the certain characteristics of the security-related event, a graphical animation of the security-related event that graphically represents the context of the security-related event with respect to the actor and the target within the computing environment. For example, generation module 108 may, as part of computing device 202 in FIG. 2, generate graphical animation 214 of the security-related event that graphically represents the context of the security-related event with respect to actor 206 and target 208. In one example, graphical animation 214 may include and/or represent a motion-picture representation of the security-related event that, when presented to a user, changes with the passing of time.

The systems described herein may perform step 306 in a variety of ways and/or contexts. In some examples, generation module 108 may generate graphical animation 214 of the security-related event by incorporating characteristics 212 into graphical animation 214. For example, generation module 108 may produce graphical animation 214 as a motion-picture representation that, when presented to the user, conveys the context of the security-related event by way of animation. By conveying the context of the security-related event to the user in this way, graphical animation 214 may enable the user to gain certain insight into and/or understanding about the security-related event that might be much less apparent to the user if the user were simply wading through the large amounts of information collected in connection with the security-related event.

In some examples, generation module 108 may generate a graphical timeline to which the motion-picture representation is synchronized. In such examples, generation module 108 may incorporate the graphical timeline into graphical animation 214 such that, when presented to the user, the motion-picture representation changes consistent with the passing of time shown on the graphical timeline. In other words, the imagery of graphical animation 214 may change in one way or another in synchronization with the time shown on the graphical timeline.

In some examples, graphical animation 214 may include a variety of graphical elements and/or images that collectively depict the context of the security-related event. For example, graphical animation 214 may include a graphical node that represents actor 206. In this example, graphical animation 214 may include another graphical node that represents target 208. Additionally or alternatively, graphical animation 214 may include at least one graphical edge that represents the action performed by actor 206 on target 208 in connection with the security-related event. Graphical animation 214 may also include various other graphical elements and/or images in connection with the security-related event and/or any additional security-related events.

In one example, generation module 108 may produce graphical animation 214 as a motion-picture representation that, when presented to the user, animates the action performed by actor 206 on target 208 using the graphical node, the other graphical node, and the graphical edge. Additionally or alternatively, generation module 108 may produce graphical animation 214 as a motion-picture representation that, when presented to the user, animates a sequential flow of actions occurring over time with respect to at least actor 206 and target 208 within computing environment 210. In this example, the motion-picture representation may, when presented to the user, depict at least one action in the sequential flow of actions as being performed by actor 206 and at least one other action in the sequential flow of actions as being performed by target 208. In other words, both actor 206 and target 208 may perform certain actions over the course of time in connection with the security-related event and/or any additional security-related events.

Examples of such actions include, without limitation, targeted attacks, suspicious files, suspicious downloads, suspicious transfers, suspicious computing behaviors or activity, clearly malicious computing behaviors or activity, self-copying or self-replication of code, load-point installations, process injections, remote logins, variations of one or more of the same, combinations of one or more of the same, or any other actions involving and/or related to computer security.

Graphical animation 214 may represent and/or depict such actions in a variety of ways. As an example, graphical animation 214 may represent and/or depict a process injection by showing a virus symbol passing from actor 206 to target 208. As another example, graphical animation 214 may represent and/or depict a self-copy or self-replication by showing actor 206 cloning itself into target 208. As a further example, graphical animation 214 may represent and/or depict a file download by showing a file icon moving from actor 206 to target 208. Additionally or alternatively, graphical animation 214 may represent and/or depict registry modifications (such as load-point installations) by showing a balloon popping above actor 206.

In some examples, graphical animation 214 may represent and/or depict various security-related events. In one example, these security-related events may be organized for presentation in chronological order within graphical animation 214. For example, generation module 108 may place a motion-picture representation of one security-related event next to another motion-picture representation of another security-related event consistent with and/or in order of time of occurrence within graphical animation 214.

In some examples, graphical animation 214 may incorporate a variety of other features to improve user experience. As an example, graphical animation 214 may distinguish external actors from internal actors by way of differing shapes, colors, and/or separations. As another example, graphical animation 214 may include and/or facilitate drill-down graph navigation that enables the user to view the graphical nodes, edges, elements, and/or images at differing levels of granularity. Additionally or alternatively, graphical animation 214 may include and/or facilitate pausing, resuming, fast-forwarding, rewinding, and/or jumping ahead or behind with respect to the motion-picture representation in connection with the graphical timeline.

In some examples, generation module 108 may produce graphical animation 214 as a motion-picture representation that, when presented to the user, depicts actor 206 positioned to the left side of target 208 on a display (such as a monitor or graphical user interface of the user). In such examples, the motion-picture representation may animate a time-based occurrence of the sequential flow of actions that flows from the left side of the display to the right side of the display as time passes.

In some examples, generation module 108 may incorporate a representation of the security-related event's severity into graphical animation 214. For example, identification module 106 may identify a severity level of the security-related event. The severity level of the security level may be based at least in part on a variety of factors (such as the reputation of actor 206, the reputation of target 208, the reputation of a file involved in the security-related event, and/or the prevalence of a file involved in the security-related event).

In one example, identification module 106 may determine the reputation of actor 206 and/or target 208 (by, e.g., querying a reputation service). Additionally or alternatively, identification module 106 may determine the reputation and/or prevalence of a file involved in the security-related event (by, e.g., querying a reputation service). Identification module 106 may then determine and/or calculate the severity level of the security-related event by applying any or all of these features to a severity-level algorithm, formula, and/or equation.

After the determination and/or calculation of the severity level of the security-related event, generation module 108 may incorporate the severity level of the security-related event into graphical animation 214. For example, generation module 108 may generate an animated feature designed to convey the severity level of the security-related event. In the event the severity level of the security-related event is relatively high, the animated feature may include and/or represent a known dangerous symbol (such as a warning symbol and/or a nuclear symbol). In the event the severity level of the security-related event is relatively low, the animated feature may include and/or represent a known symbol of safety (such as a green sign and/or checkmark). In any case, generation module 108 may provide this animated feature within graphical animation 214 to convey the severity level of the security-related event to the user.

Returning to FIG. 3, at step 308 one or more of the systems described herein may provide, for presentation to a user, the graphical animation of the security-related event to facilitate visualizing the context of the security-related event with respect to the actor and the target within the computing environment. For example, presentation module 110 may, as part of computing device 202 in FIG. 2, provide graphical animation 214 of the security-related event for presentation to the user.

In one example, the user may be a security analyst tasked with classifying security-related events as malicious, clean, or unknown. By providing graphical animation 214 for presentation to the security analyst in this way, presentation module 110 may enable the user to visualize the context of the security-related event. By facilitating visualization of the context of the security-related event in this way, presentation module 110 may enable the security analyst to gain enough insight into the security-related event to make a quick, accurate decision on how to classify and/or address the computer security event.

In another example, the user may be a business executive (or another kind of non-technical user) who needs a fairly straightforward and/or non-technical explanation of the security-related event. By providing graphical animation 214 for presentation to the business executive in this way, presentation module 110 may enable the business executive to visualize the context of the security-related event without much in the way of technical skills and/or education in the computer security arts. By facilitating visualization of the context of the security-related event in this way, presentation module 110 may enable the security analyst to gain a fairly clear understanding as to the nature of the security-related event prior to making any high-level business decisions about the direction and/or fate of the company.

The systems described herein may perform step 308 in a variety of ways and/or contexts. In some examples, presentation module 110 may provide graphical animation 214 for presentation to the user by displaying graphical animation 214 on a monitor or display of the user. For example, in the event that the user is operating computing device 202, presentation module 110 may direct computing device 202 to display graphical animation 214 on a monitor or display associated with computing device 202. Additionally or alternatively, presentation module 110 may provide graphical animation 214 to another computing device (not necessarily illustrated in FIG. 2) that is operated by the user and/or direct that other computing device to display graphical animation 214 on a monitor or display so that the user is able to view graphical animation 214.

Figure 4:
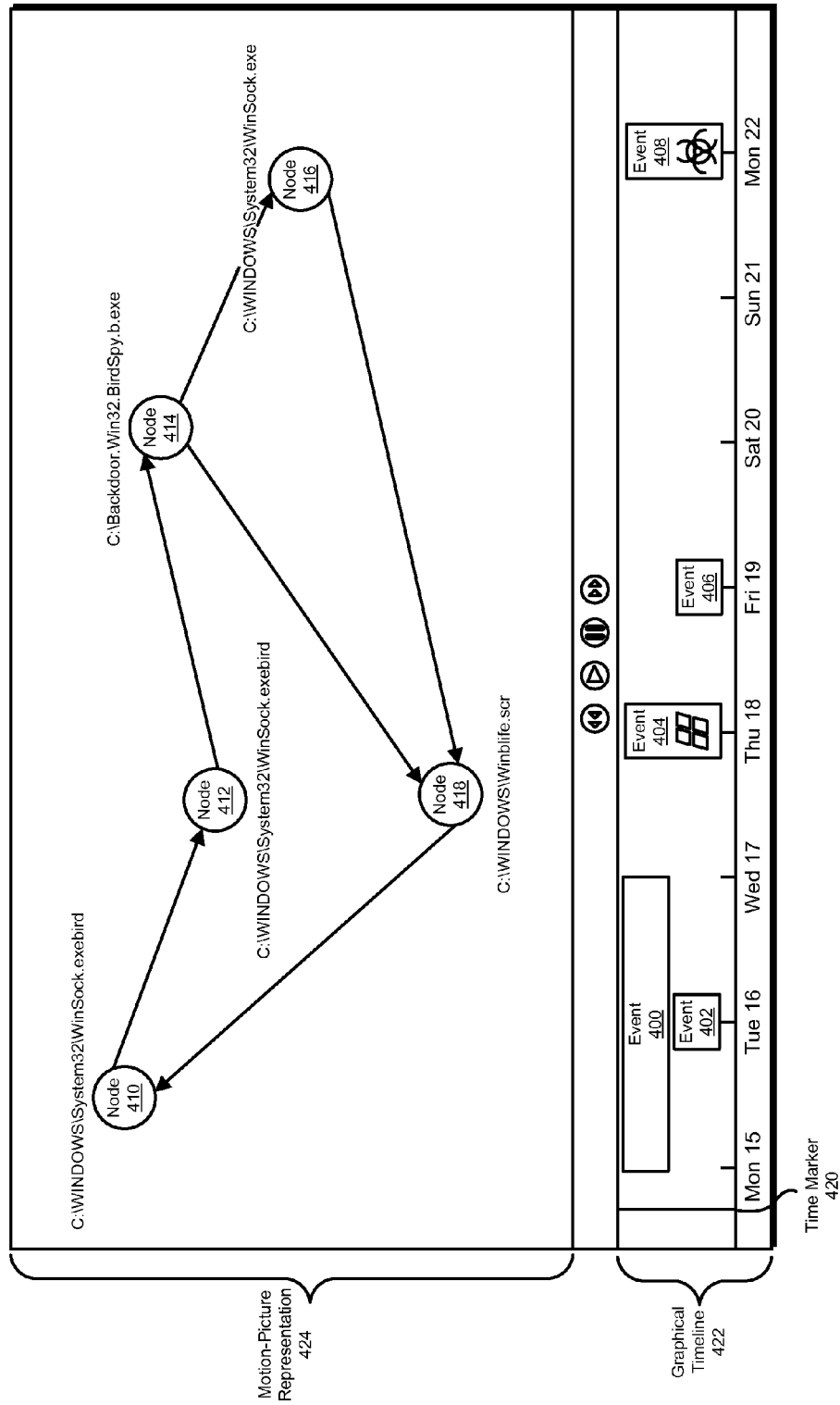
FIG. 4 is an illustration of an exemplary graphical animation of a security-related event at a first point in time.
Figure 5:
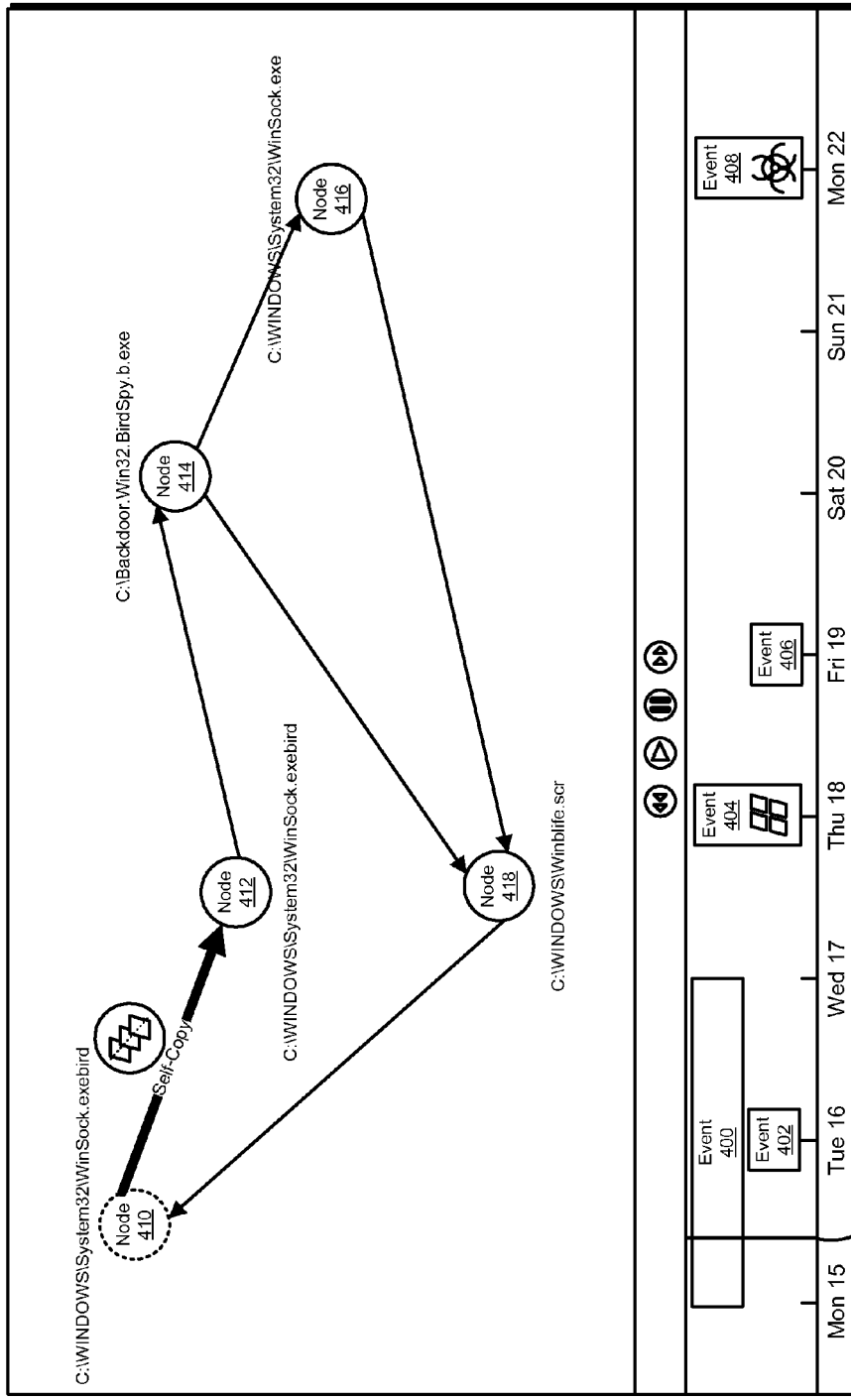
FIG. 5 is an illustration of the exemplary graphical animation from FIG. 4 at a second point in time.
Figure 6:
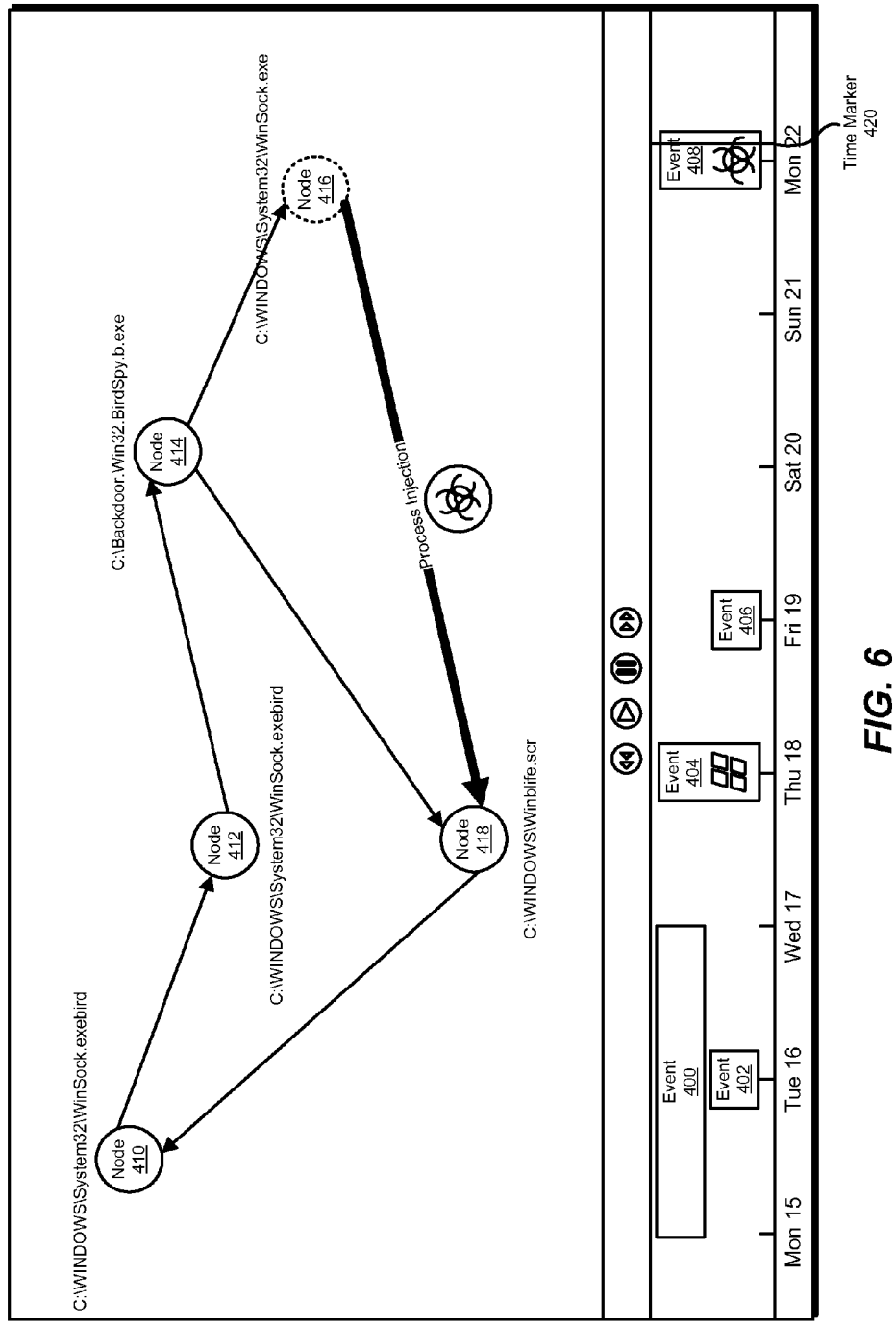
FIG. 6 is an illustration of the exemplary graphical animation from FIGS. 4 and 5 at a third point in time.

As a specific example, presentation module 110 may provide graphical animation 214 in FIGS. 4-6 for presentation to the user. FIG. 4 illustrates graphical animation 214 at a first point in time. As illustrated in FIG. 4, graphical animation 214 may include a motion-picture representation 424 that shows graphical node 410 (in this example, representative of "C:\WINDOWS\System32\WinSock.exebird"), graphical node 412 (in this example, representative of "C:\WINDOWS\System32\WinSock.exebird"), graphical node 414 (in this example, representative of "C:\Backdoor.Win32.BirdSpy.b.exe"), graphical node 416 (in this example, representative of "C:\WINDOWS\System32\WinSock.exe"), and graphical node 418 (in this example, representative of "C:\WINDOWS\Winlife.scr"). In this example, nodes 410, 412, 414, 416, and 418 may be connected to one another by various graphical edges.

As illustrated in FIG. 4, graphical animation 214 may also include a graphical timeline 422 that shows security-related events 400, 402, 404, 406, and 408 organized and/or laid out by the date and/or time of occurrence. In this example, graphical timeline 422 may include a time marker 420 (in this example, positioned to the left side of "Mon 15") that identifies the point in time reflected and/or represented by motion-picture representation 424. Accordingly, when graphical animation 214 is played for the user, motion-picture representation 424 may change consistent with the passing of time shown on the graphical timeline.

FIG. 5 illustrates graphical animation 214 at a second point in time. As illustrated in FIG. 5, time marker 420 (in this example, positioned between "Mon 15" and "Tue 16") is overlapping event 400. This overlap may indicate that event 400 is reflected and/or represented by motion-picture representation 424 at the second point in time. For example, the depiction and/or animation of event 400 shown in motion-picture representation 424 in FIG. 5 may involve a change (in this example, a dashed perimeter pattern) to node 410, a change (in this example, a thicker weighted line) to the graphical edge representing the action performed by node 410 on node 412, and/or the addition of text and/or a graphical icon (in this example, "Self-Copy" and a graphical icon of the self-copy action) that identifies and/or indicates the action involved in event 400. Various other changes (not necessarily illustrated in FIG. 5) to motion-picture representation 424 may also be depicted and/or represented by graphical animation 214 in synchronization with the time shown on graphical timeline 422.

FIG. 6 illustrates graphical animation 214 at a third point in time. As illustrated in FIG. 6, time marker 420 (in this example, positioned to the right side of "Mon 22") is overlapping event 408. This overlap may indicate that event 408 is reflected and/or represented by motion-picture representation 424 at the third point in time. For example, the depiction and/or animation of event 408 shown in motion-picture representation 424 in FIG. 6 may involve a change (in this example, a dashed perimeter pattern) to node 416, a change (in this example, a thicker weighted line) to the graphical edge representing the action performed by node 416 on node 418, and/or the addition of text and/or a graphical icon (in this example, "Process Injection" and a graphical virus symbol) that identifies and/or indicates the significance of the action involved in event 408. Various other changes (not necessarily illustrated in FIG. 6) to motion-picture representation 424 may also be depicted and/or represented by graphical animation 214 in synchronization with the time shown on graphical timeline 422.

Figure 7:
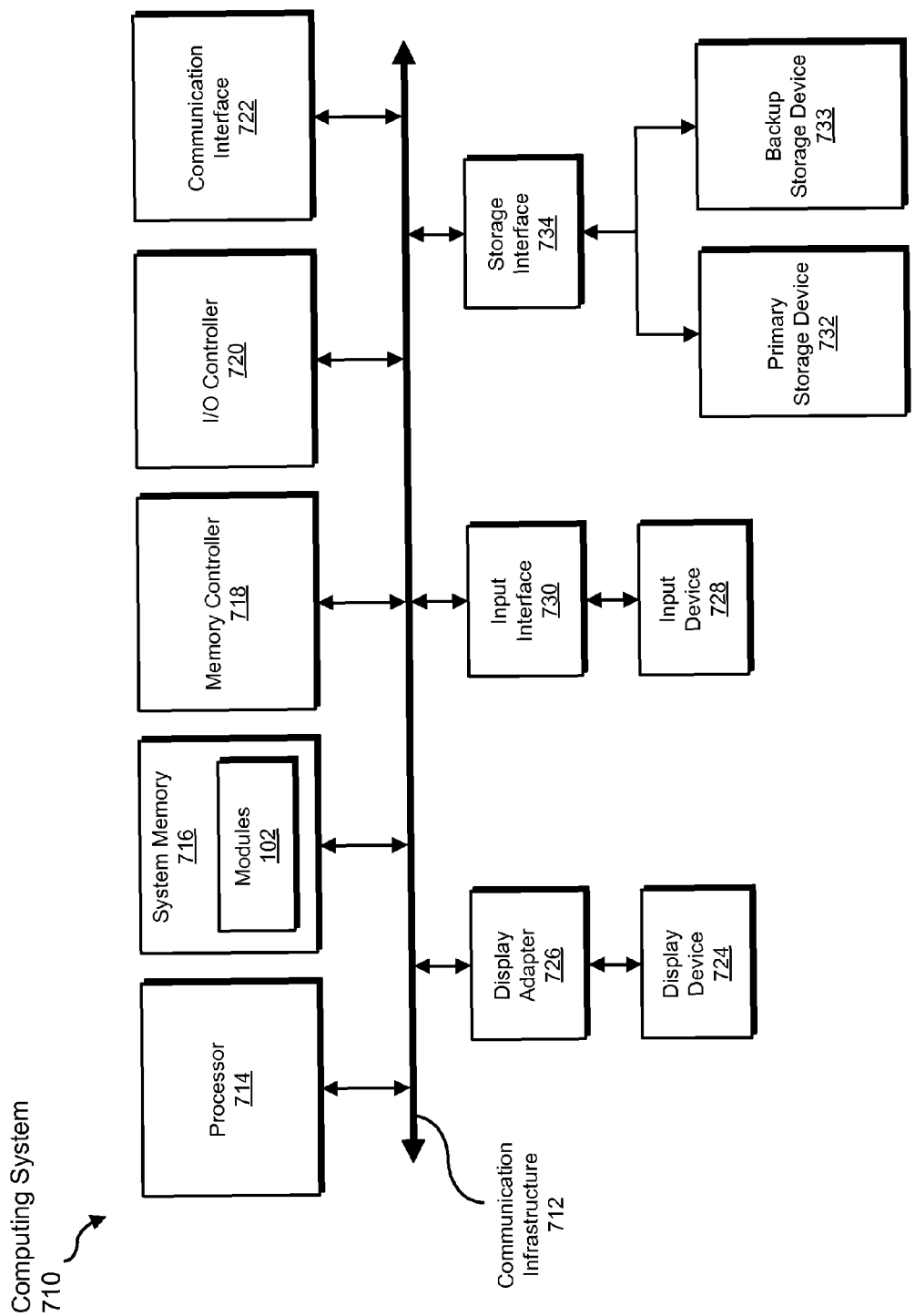
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
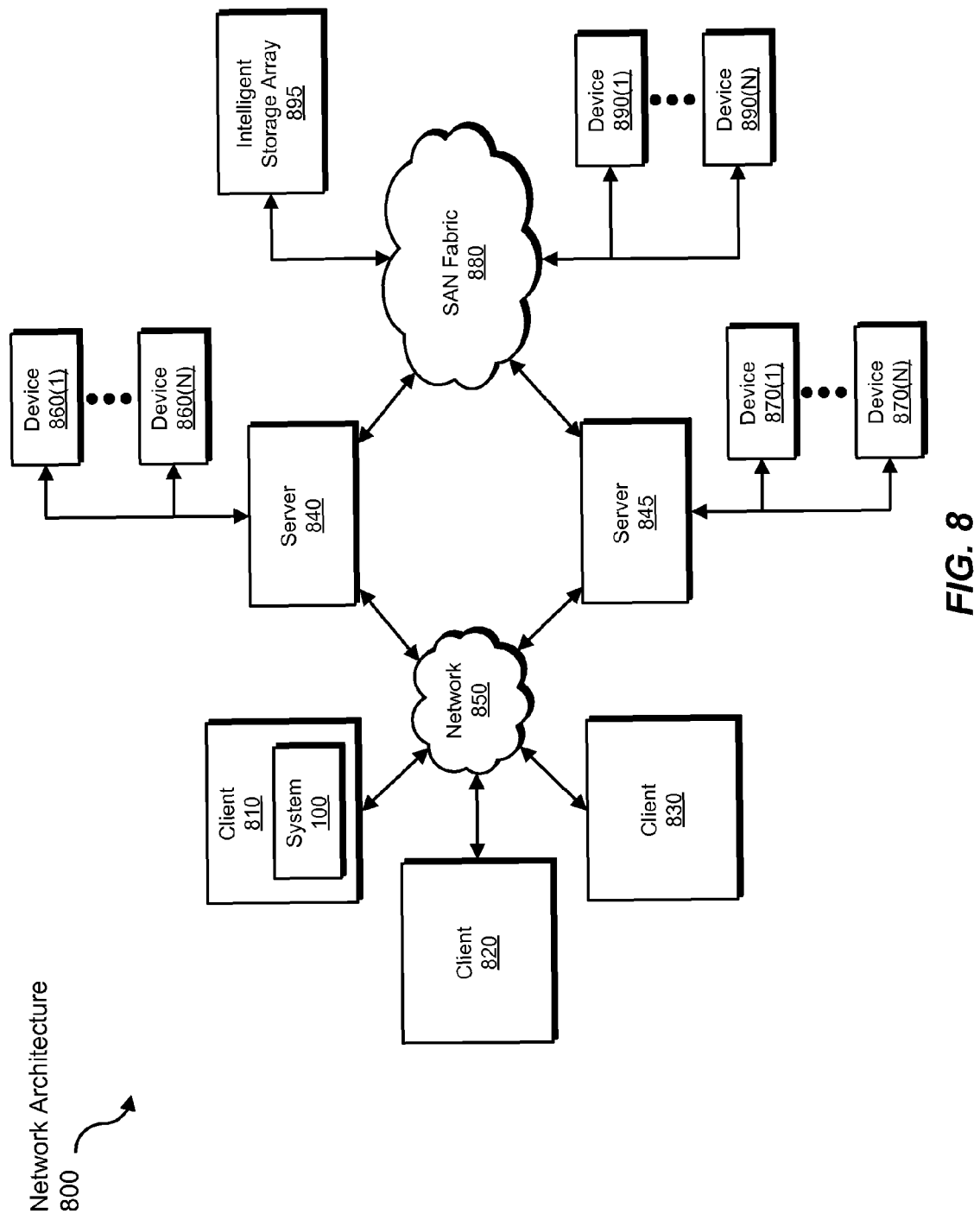
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for generating contextually meaningful animated visualizations of computer security events.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive event-characteristics data to be transformed, transform the event-characteristics data into a graphical representation of a security event, output a result of the transformation to facilitate visualization of the security event, use the result of the transformation for presentation to a user, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for generating contextually meaningful animated visualizations of computer security events, at least a portion of the method being performed by a computing device comprising at least one processor, the method comprising:

detecting a security-related event that involves an actor and a target within a computing environment;

identifying certain characteristics of the security-related event that collectively describe a context of the security-related event with respect to the actor and the target within the computing environment;

generating, based at least in part on the certain characteristics of the security-related event, a graphical animation of the security-related event that:

includes a motion-picture representation of the security-related event that, when presented to a user, changes with a passing of time; and graphically represents the context of the security-related event with respect to the actor and the target within the computing environment;

generating a graphical timeline to which the motion-picture representation is synchronized such that, when presented to the user, the motion-picture representation changes consistent with the passing of time shown on the graphical timeline, wherein the graphical timeline includes:

a time marker that identifies a point in time reflected in the motion-picture representation; and a graphical representation of the security-related event that is positioned relative to the time marker within the graphical timeline, wherein the time marker overlaps the graphical representation of the security-related event when the security-related event is reflected in the motion-picture representation; and providing, for presentation to the user, the graphical animation of the security-related event to facilitate visualizing the context of the security-related event with respect to the actor and the target within the computing environment.

2. The method of claim 1, wherein the graphical animation of the security-related event comprises:
a graphical node that represents the actor;
another graphical node that represents the target; and
a graphical edge that represents an action performed by the actor on the target in connection with the security-related event.

3. The method of claim 2, wherein the motion-picture representation of the security-related event, when presented to the user, animates the action performed by the actor on the target using the graphical node, the other graphical node, and the graphical edge.

4. The method of claim 1, wherein the motion-picture representation of the security-related event, when presented to the user, animates a sequential flow of actions occurring over time with respect to at least the actor and the target within the computing environment.

5. The method of claim 4, wherein generating the animation of the security-related event comprises generating the motion-picture representation of the security-related event such that, when presented to the user, the motion-picture representation depicts at least one action in the sequential flow of actions being performed by the actor and at least one other action in the sequential flow of actions being performed by the target.

6. The method of claim 4, wherein generating the animation of the security-related event comprises generating the motion-picture representation of the security-related event such that, when presented to the user, the motion-picture representation:
depicts the actor positioned on a left side of the target on a display; and
animates a time-based occurrence of the sequential flow of actions that flows from a left side of the display to a right side of the display over time.

7. The method of claim 1, wherein generating the graphical animation of the security-related event comprises:
identifying a severity level of the security-related event; and
providing, within the graphical animation of the security-related event, an animated feature designed to convey the severity level of the security-related event.

8. The method of claim 7, wherein identifying a severity level of the security-related event comprises at least one of:
determining a reputation of the actor;
determining a reputation of the target;
determining a reputation of a file involved in the security-related event; and
determining a prevalence of a file involved in the security-related event.

9. A system for generating contextually meaningful animated visualizations of computer security events, the system comprising:
a detection module, stored in memory, that detects a security-related event that involves an actor and a target within a computing environment;
an identification module, stored in memory, that identifies certain characteristics of the security-related event that collectively describe a context of the security-related event with respect to the actor and the target within the computing environment;
a generation module, stored in memory, that:
generates, based at least in part on the certain characteristics of the security-related event, a graphical animation of the security-related event that:
includes a motion-picture representation of the security-related event that, when presented to a user, changes with a passing of time; and
graphically represents the context of the security-related event with respect to the actor and the target within the computing environment;
generates a graphical timeline to which the motion-picture representation is synchronized such that, when presented to the user, the motion-picture representation changes consistent with the passing of time shown on the graphical timeline, wherein the graphical timeline includes:
a time marker that identifies a point in time reflected in the motion-picture representation; and
a graphical representation of the security-related event that is positioned relative to the time marker within the graphical timeline, wherein the time marker overlaps the graphical representation of the security-related event when the security-related event is reflected in the motion-picture representation;
a presentation module, stored in memory, that provides, for presentation to the user, the graphical animation of the security-related event to facilitate visualizing the context of the security-related event with respect to the actor and the target within the computing environment; and
at least one physical processor configured to execute the detection module, the identification module, the generation module, and the presentation module.

10. The system of claim 9, wherein the graphical animation of the security-related event comprises:
a graphical node that represents the actor;
another graphical node that represents the target; and
a graphical edge that represents an action performed by the actor on the target in connection with the security-related event.

11. The system of claim 10, wherein the motion-picture representation of the security-related event, when presented to the user, animates the action performed by the actor on the target using the graphical node, the other graphical node, and the graphical edge.

12. The system of claim 9, wherein the motion-picture representation of the security-related event, when presented to the user, animates a sequential flow of actions occurring over time with respect to at least the actor and the target within the computing environment.

13. The system of claim 12, wherein the generation module generates the motion-picture representation of the security-related event such that, when presented to the user, the motion-picture representation depicts at least one action in the sequential flow of actions being performed by the actor and at least one other action in the sequential flow of actions being performed by the target.

14. The system of claim 12, wherein the generation module generates the motion-picture representation of the security-related event such that, when presented to the user, the motion-picture representation:

depicts the actor positioned on a left side of the target on a display; and animates a time-based occurrence of the sequential flow of actions that flows from a left side of the display to a right side of the display over time.

15. The system of claim 12, wherein generating the graphical animation of the security-related event comprises:

identifying a severity level of the security-related event; and providing, within the graphical animation of the security-related event, an animated feature designed to convey the severity level of the security-related event.

16. A non-transitory computer-readable medium comprising one or more computer-executable instructions that, when executed by at least one processor of a computing device, cause the computing device to:

detect a security-related event that involves an actor and a target within a computing environment;

identify certain characteristics of the security-related event that collectively describe a context of the security-related event with respect to the actor and the target within the computing environment;

generate, based at least in part on the certain characteristics of the security-related event, a graphical animation of the security-related event that:

includes a motion-picture presentation of the security-related event that, when presented to a user, changes with a passing of time; and graphically represents the context of the security-related event with respect to the actor and the target within the computing environment;

generate a graphical timeline to which the motion-picture representation is synchronized such that, when presented to the user, the motion-picture representation changes consistent with the passing of time shown on the graphical timeline, wherein the graphical timeline includes:

a time marker that identifies a point in time reflected in the motion-picture representation; and a graphical representation of the security-related event that is positioned relative to the time marker within the graphical timeline, wherein the time marker overlaps the graphical representation of the security-related event when the security-related event is reflected in the motion-picture representation; and provide, for presentation to a user, the graphical animation of the security-related event to facilitate visualizing the context of the security-related event with respect to the actor and the target within the computing environment.

* * * * *

UNITED STATES PATENT AND TRADEMARK OFFICE
CERTIFICATE OF CORRECTION

PATENT NO. : 9,825,986 B1  
APPLICATION NO. : 14/753038  
DATED : November 21, 2017  
INVENTOR(S) : Bhatkar et al.

Page 1 of 1

It is certified that error appears in the above-identified patent and that said Letters Patent is hereby corrected as shown below:

In the Claims

In Column 24, Line 1, in Claim 16, delete "presentation of" and insert -- representation of --, therefor.

Signed and Sealed this
Seventeenth Day of April, 2018

Andrei Iancu
*Director of the United States Patent and Trademark Office*